Figure 1:
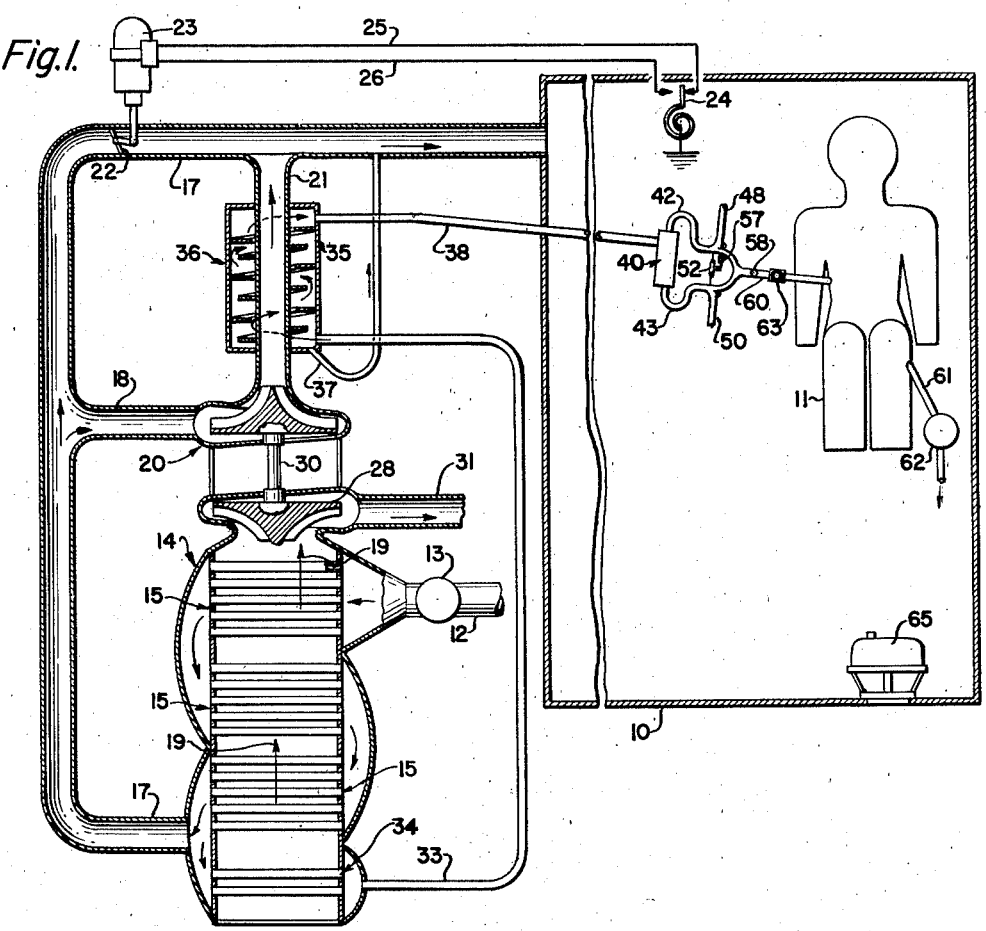

Jan. 14, 1958  F. H. GREEN  2,819,590
VENTILATED SUIT REFRIGERATION UNIT
Filed Aug. 21, 1953

FREDERICK H. GREEN,
INVENTOR.

BY John H. J. Wallace

United States Patent Office 2,819,590
Patented Jan. 14, 1958

2,819,590

VENTILATED SUIT REFRIGERATION UNIT

Frederick H. Green, Palos Verdes Estates, Calif., assignor to The Garrett Corporation, Los Angeles, Calif., a corporation of California Application August 21, 1953, Serial No. 375,743

28 Claims. (Cl. 62—6)

This invention relates generally to fluid conditioning or refrigeration systems, and particularly relates to apparatus for supplying cooled gas such as air to two separate enclosures.

The system of the present invention is particularly adapted for supplying conditioned air both to an aircraft cabin and to a ventilated or pressurized suit disposed within the cabin and will be described in connection therewith. It is to be understood, however, that the conditioning system of the invention may be used for other purposes. Thus the system of the invention may be utilized for supplying conditioned gas to two separate enclosures, which need not be disposed one inside the other, so as to maintain each enclosure at a different temperature and gas pressure. By way of example, the system of the invention may be used to supply refrigerated air under pressure to electric or electronic equipment included in enclosures which may be substantially airtight and provided with an outflow regulator or other known means for controlling pressure therewithin so as to prevent arcing of a generator, which may occur at reduced air pressure, or to maintain electronic equipment within a predetermined temperature range to improve its performance.

Pressurized aircraft cabins are conventional in the art and apparatus is well known for maintaining the air pressure and temperature within the cabin at a level to provide for the passengers' and pilot's comfort regardless of the temperature and pressure of the ambient air. Hence, the equipment for sensing the cabin temperature at various points for correlating these temperatures and for developing a signal representative of such temperatures and their rates of change is well known and forms no part of this invention. The present invention is concerned primarily with a conditioning or refrigeration system for supplying two separate enclosures with a gas such as air so as to maintain each enclosure at a separate selected temperature and pressure.

However, for certain applications it is not sufficient merely to provide a pressurized aircraft cabin. For example, a modern high-speed airplane heats up considerably due to air friction and ram compression. Consequently, the aircraft cabin may require a very large amount of cooling in order to maintain it at a comfortable temperature. The problem of cooling and pressurizing the aircraft cabin may be considerably reduced by providing a pressurized and cooled suit for the pilot. Naturally, such a suit requires a smaller flow of air to maintain the pilot in comfort than does a much larger cabin. By way of example, assuming the skin temperature of an airplane to be 110° F., an air flow of the order of one to two pounds per minute may be sufficient for a pilot's suit, while a small cabin would require an air flow of the order of seven to ten pounds per minute. A pressurized pilot's suit also adds to the safety of the airplane because in case the cabin should develop an air leak, enough pressure can be maintained within the pilot's suit to enable the pilot to survive even at extremely high altitudes of the plane.

A pressurized aircraft cabin, in addition to increasing the safety of the plane, also permits conditioning of air for electronic equipment which may be located in the cabin. Furthermore, it reduces the pressure differential across the pilot's suit. It should also be pointed out that a pressurized pilot's suit requires ventilation, preferably by means of dried air or gas, to remove the body moisture which otherwise collects in the suit. Since the pilot's suit normally includes a helmet, the moisture collected within the suit is further increased by the moisture of the exhaled air. However, it will be understood that if a helmet forms part of the pilot's suit, and high altitude operation is contemplated, oxygen from a separate source is usually supplied to enable the pilot to breathe under such conditions.

In general, both the temperature and pressure to be maintained within an aircraft cabin and within a separate suit will be different. For example, under normal operating conditions the suit may require higher temperatures during cabin cooling and lower temperatures during cabin heating. Furthermore, it will usually be convenient to maintain the pilot's suit at a higher pressure than the cabin, at least under conditions of high altitude flight. Thus an air conditioning or air cooling system for such purposes must be able to supply, at the same time, air to two different enclosures at different temperatures and pressures.

It is accordingly an object of the present invention to provide a refrigeration or conditioning system for supplying two separate enclosures with gas or air to maintain each enclosure at separate selected temperatures and pressures.

A further object of the invention is to provide an air conditioning system for an aircraft cabin and for a pressurized pilot's suit within the cabin, the suit conditioning system being "fail-safe" whereby the temperature of the air supplied to the pilot's suit will not exceed a safe upper limit in case of certain system failures.

Another object of the invention is to provide a simple, efficient conditioning or refrigeration system for an aircraft cabin and a pressurized pilot's suit within the cabin which requires a minimum of component parts and yet will maintain the suit and the cabin at different selected temperatures and pressures, and will provide different rates of fluid flow to both the cabin and the suit.

Still a further object of the invention is to utilize a vortex tube for supplying a compressible fluid of a predetermined and controllable temperature in spite of wide variations of the temperature of the compressed fluid supplied to the vortex tube.

Still another object of the invention is to provide apparatus for supplying to a pressurized pilot's suit, ventilating air which has been dried to a condition such that it will evaporate moisture from the pilot's body which would otherwise collect in the suit.

The refrigeration system in accordance with the present invention will supply cooled gas to two enclosed spaces such, for example, as an aircraft cabin and a pilot's suit. The system comprises means for cooling hot compressed gas and preferably the cooling means consists of a heat exchanger. A portion of the compressed gas cooled by the heat exchanger is supplied to one of the enclosed spaces, for example, the aircraft cabin. Before the gas is supplied to the cabin, it may be further cooled, preferably by an expansion turbine, although a vapor cycle engine or other cooling means may be used instead. The expansion turbine may be utilized for driving a fan to force cooling fluid through the heat exchanger. Preferably a portion of the air which is cooled by the turbine is mixed with a portion of the air obtained directly from the heat exchanger and the mixed air supplied to the cabin for maintaining a desired temperature therein.

The remainder of the air obtained from the heat exchanger may be further cooled by heat exchange means which is preferably disposed adjacent the expansion turbine. In this manner, icing of the turbine outlet is prevented while the air to be supplied to the pilot's suit is further cooled. Furthermore, water will condense from the further cooled air to be supplied to the pilot's suit so that the air supplied thereto is dried.

Further in accordance with the present invention, the compressed and dried air is supplied to a vortex tube which will supply two fractions of air, one having a temperature below and the other having a temperature above that of the air supplied to the vortex tube. The outlet ducts of the vortex tube are provided with valve means responsive to the temperature of the air flowing to the pilot's suit for mixing the two fractions of air supplied by the vortex tube. Thus the air supplied to the pilot's suit may be maintained within a very narrow temperature range in spite of wide variations of the temperature of the air supplied to the vortex tube.

The vortex tube utilized in the system of the present invention has first been disclosed by G. J. Ranque in U. S. Patent 1,952,281 granted March 27, 1934. Various modifications of the Ranque vortex tube have been discussed in the literature, for example, in a paper by R. Hilsch which appears in "The Review of Scientific Instruments," volume 18, number 2, pages 108–113, February 1947. The operation of such a vortex tube is further discussed by D. S. Webster in a paper which appears in "Refrigeration Engineering" of February, 1950, pages 163–171, further literature being cited in this paper. Although there is no agreement at the present time as to the exact theory of operation of such a vortex tube, it is well known that if a compressible fluid is supplied to the tube under pressure, two fractions of fluid may be obtained from the tube having temperatures which are above and below that of the fluid supplied thereto. The differences in temperature of the hot and cold fluid fractions may be much larger than one hnudred degrees Fahrenheit.

Figure 2:
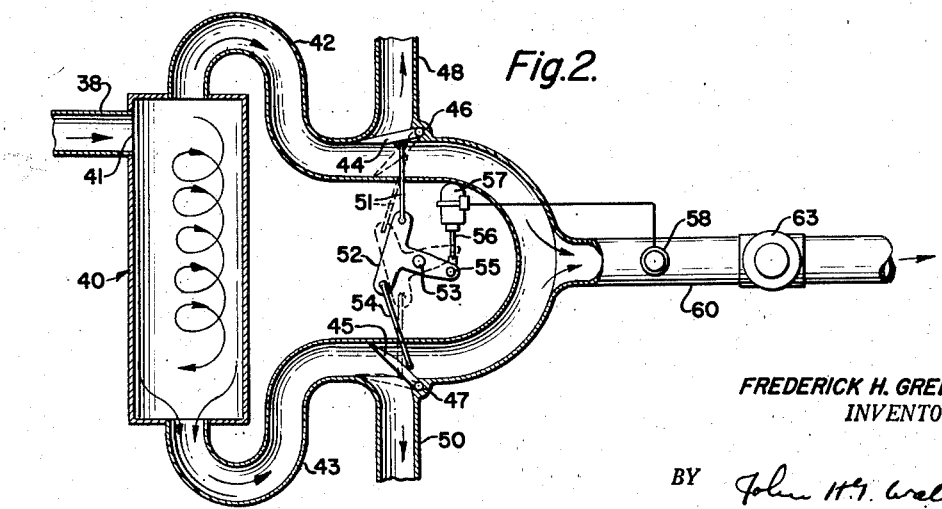

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Fig. 1 is a schematic representation of a refrigeration system embodying the present invention for supplying cooled air to an aircraft cabin and to a pilot's suit within the cabin; and Fig. 2 is a schematic view on enlarged scale of a vortex tube and its valve mechanism forming part of the system of Fig. 1.

Referring now to the drawing, there is illustrated a refrigeration or air conditioning system for supplying air or gas to two separate enclosures. By way of example, Fig. 1 shows an aircraft cabin 10 and a pressurized or ventilated suit 11 within the cabin 10 which are to be supplied with conditioned air. However, as explained hereinbefore, the system of the invention may be used for cooling or air conditioning two enclosures which may contain, for example, electric or electronic equipment. The pilot's suit 11, as shown in the drawing includes a pressure-tight helmet. In case high altitude flight is contemplated air or oxygen from a separate source must be supplied to enable the pilot to breathe under such flight conditions. However, the suit need not include a helmet.

Air under pressure is delivered from a source, not shown, to conduit 12 provided with a shut-off valve 13. Compressed air may be supplied, for example, from an engine supercharger if the airplane has a piston engine or from the compressor of a jet airplane engine. The compressed air within duct 12 will generally be hot and hence must be cooled. This is effected, for example, by means of a heat exchanger schematically indicated at 14. The heat exchanger 14 may, for example, have three passes as shown at 15. The compressed air cooled therein discharged through a duct 17 which is connected to the aircraft cabin 10. A portion of the compressed air flowing within duct 17 is carried off by a branch duct 18 and enters, for example, an expansion turbine 20 wherein the air is expanded and further cooled. It will be understood, however, that any other cooling means may be substituted for the expansion turbine 20, such, for example, as a vapor cycle engine. The air discharged from the turbine 20 is connected through a turbine discharge duct 21 with the duct 17 which permits unrestricted air flow into the cabin.

The temperature within the cabin 10 may be regulated by means of a bypass valve 22 located in duct 17 upstream of its junction with the duct 21. The valve 22 may be operated by a pneumatically operated actuator or by an electrically energized actuator 23 as illustrated which in turn is controlled by a thermostatic switch 24 located in the cabin 10. In response to variations in the temperature in the cabin, the thermostatic switch 24 will ground either conductor 25 or conductor 26, thereby to energize actuator 23 to rotate valve 22 in such direction that the air in the cabin maintains the desired value.

Preferably the energy obtained by expansion of the air through turbine 20 is utilized for driving a fan 28 disposed at the end of the heat exchanger 14. To this end, turbine 20 and fan 28 are interconnected by a shaft 30. The fan 28 will force cooling air or any other cooling fluid through the heat exchanger as indicated by the arrows 19, and the cooling fluid is discharged through a discharge duct 31.

As explained hereinbefore, the temperature within the pilot's suit will generally have to be maintained at a different value than that of the temperature of the cabin. Furthermore, it will generally be required that the pressure of the air flowing to the pilot's suit be higher than that of the air in the cabin. Consequently, air from the outlet duct of the main or cabin refrigeration unit cannot conveniently be used for supplying air to the pilot's suit without seriously lowering the capacity of the cabin refrigeration unit. Therefore, in accordance with the present invention, there is provided a special refrigeration system for the air to be supplied to the pilot's suit. Thus a comparatively small portion of the air which is cooled by heat exchanger 14 is passed into an outlet duct 33. This air may either be obtained directly from outlet duct 17 or preferably a fourth pass 34 is provided in the heat exchanger to further cool the air before it is supplied to duct 33. Since the cooling air flowing through the heat exchanger passes first over the pass 34, the air supplied to duct 33 will be cooler than that flowing into outlet duct 17. As indicated by the relative sizes of ducts 33 and 17, only a small portion of the order of 10% of the total air is supplied to the suit.

The cooled and compressed air flowing through duct 33 now flows into a helical coil or an annular space formed between the turbine discharge duct 21 and an outer jacket 35 to provide a second heat exchanger generally indicated at 36. In some cases, it may be desirable to locate the second heat exchanger 36 adjacent to the turbine 20 and to form the discharge duct 21 integral with the discharge casing of the turbine in the manner disclosed and claimed in the patent to Scofield and Green 2,628,481, issued February 17, 1953. The heat exchanger 36 has several purposes. In the first place, it further cools the air for the suit supplied thereto by duct 33 and at the same time, it will heat to a certain extent, the air flowing through the turbine discharge duct 21. Consequently, it will minimize icing on the walls of the turbine discharge duct due to the temperature reduction of the airflow through the turbine as explained in the Scofield-Green patent referred to above.

Finally, moisture in the air for the pilot's suit which flows through the heat exchanger 36 is condensed and collects at the bottom thereof and may be removed, for example, through an outlet pipe 37 connected to the duct 17. Since the pressure in duct 17 downstream from expansion turbine 20 is lower than that within the jacket 35 of heat exchanger 36, a small but not necessarily negligible amount of air will leak into duct 17 through pipe 37 and will assist in discharging the condensed moisture of the pilot's suit air into the duct. In general, the air supplied to the cabin should be somewhat moist; hence, the moisture removed from the suit air may be beneficially discharged into the cabin air. In this manner the air and moisture discharged through pipe 37 are utilized without the loss of energy which would be caused by merely dumping them overboard. However, it is to be understood that any other type of water separator may be used instead.

Thus, the air for the pilot's suit is further cooled and dried and is discharged through a duct 38 which extends into the cabin.

It is quite important to maintain the temperature of the air delivered to the pilot's suit within a narrow, selected temperature range. On the other hand, the temperature of the airflow into the duct 38 will vary widely due to varying requirements of the cabin refrigeration unit and to the conditions of flight. Furthermore, the flow of air through the duct 38 is comparatively small and may be of the order of one pound per minute. As a result the air flowing through a comparatively long duct may change its temperature appreciably due to heat exchange with the air surrounding it. Consequently, the temperature of the air delivered into the pilot's unit is difficult to control unless a refrigeration unit is provided which may be disposed closely adjacent the suit or which may be directly attached to the suit.

In accordance with the present invention, this is accomplished by utilizing a vortex tube 40 shown in greater detail in Fig. 2. It will be understood that a vortex tube is much smaller and is considerably lighter than a conventional heat exchanger or expansion turbine would be. The vortex tube 40 may be of any conventional type as described in the literature previously referred to. The air is delivered to the vortex tube through an inlet nozzle 41 which may, for example, be of the tangential type although other types of nozzles may be used. The vortex tube is provided with two outlet ducts 42 and 43, outlet duct 42 carrying a fraction of air which has a temperature that is below that supplied to the vortex tube, while outlet duct 43 carries another fraction of air having a temperature that is above that of the air supplied to the vortex tube. Further in accordance with the present invention, predetermined portions of the cold and hot air fractions are mixed and supplied to the suit. To this end, there are provided separate airflow regulating valves 44 and 45 in each of the two outlet ducts 42 and 43. The two airflow valves 44 and 45 are pivoted respectively at 46 and 47 and are disposed to communicate with respective discharge ducts 48 and 50 through which the unused portions of air may be discharged either into the cabin or into the ambient atmosphere outside of the cabin.

The two airflow regulating valves 44 and 45 are interconnected through a rod 51 linked to valve 44, a T-lever 52 pivoted at 53 and a rod 54 linked to valve 45. The lever 52 is linked at 55 to the actuating rod 56 of an actuator 57 which in turn is controlled by a thermostat 58 which may, for example, be disposed in a common outlet duct 60. The outlet duct 60 interconnects the outlet ducts 42 and 43 with the pilot's suit. It will also be understood that the thermostat 58 may be disposed within the pilot's suit and that its main function is to control the temperature of the air in accordance with the pilot's requirements. From the pilot's suit the air is discharged through a duct 61 provided with any suitable valve or pressure regulator 62 which may be adjusted to control the air pressure within the suit. A valve 63 may be disposed within the duct 60 and is also manually adjustable for controlling the airflow through the pilot's suit.

The refrigeration system of the present invention comprises means by which the hot compressed air entering the system through the duct 12 is cooled. This may be effected by the heat exchanger 14, and the main portion of the air is discharged through the duct 17. A portion of the pre-cooled air is further cooled and its pressure reduced by means of the expansion turbine 20. The expansion turbine in turn drives the fan 28 for inducing a flow of cooling fluid through the heat exchanger. The air discharged from the turbine 20 is partially heated again by heat exchange with the air in the duct 33 which, of course, results in further cooling of the air discharged into duct 38.

In response to the operation of the thermostat 24, the actuator 23 positions the bypass valve 22 in the duct 17 thereby to control the amount of relatively hot air which is mixed with the cooled air supplied by the duct 21. The pressure in the cabin is controlled by means of a pressure regulator 65 disposed therein and which may be of any conventional type.

A portion of the air cooled by the heat exchanger 14 may be further cooled by causing it to flow through the pass 34 and is supplied through duct 33 to the second heat exchanger 36. There, the moisture is removed and the air is further cooled. The dried, cooled and still compressed air is now supplied to the vortex tube 40 which in turn delivers both a cold and a hot fraction of air. The thermostat 58 controls the two airflow valves 44 and 45 in unison by means of actuator 57. For example, when relatively cool air is required for the pilot's suit, the valves may be in the position shown in full lines in Fig. 2. Accordingly, the cold air fraction flows from duct 42 to duct 60, while the hot air fraction from duct 43 flows into discharge duct 50. On the other hand, when relatively hot air is required for the pilot's suit, the two airflow valves may be in their dotted line positions. Accordingly, the cold air is discharged through discharge duct 48 while the hot fraction flows into duct 60. Depending upon requirements, the valves will usually have an intermediate or modulating position to mix the hot and cold air fractions.

The valve 63 permits control of the flow of air into the pilot's suit. Alternatively, it may be located in duct 38 so as not to constitute a detrimental downstream restriction which might interfere with the operation of the vortex tube. The valve or pressure regulator 62 controls the pressure in the suit.

The refrigeration system for the pilot's suit will accordingly supply dried air to remove the moisture which would collect in the suit due to body moisture and also due to the moisture in the exhaled air if the suit should be provided with a helmet. The temperature difference between the hot and cold air fractions obtained from the vortex tube may be of the order of 160° F. under the anticipated operating conditions. Hence the temperature of the air supplied to the suit may be kept within a very narrow temperature range in spite of wide variations of the temperature of the air supplied by duct 38. Since a vortex tube is relatively small and light, it may conveniently be directly attached to the pilot's suit or at least it can be provided in close proximity thereto. This in turn will reduce to a minimum temperature changes of the air flowing in the duct 60 due to heat exchange with the surrounding air so that the temperature in the pilot's suit may be positively controlled.

It will further be noted that the refrigeration system of the invention is "fail-safe." Thus even if the temperature controls should fail to operate, the hot compressed air will be cooled in the heat exchanger 14 before it is supplied to the suit. This will prevent a dangerous rise in the temperature of the air supplied to the suit.

I claim:

1. A refrigeration system for supplying cooled gas to a first and to a second enclosed space, said system comprising means for cooling a supply of hot compressed gas, means connected to said cooling means for delivering the cooled gas to said first enclosed space, a vortex tube connected to said cooling means for supplying a first fraction of gas at a temperature below that of said cooled gas and a second fraction of gas at a temperature above that of said cooled gas, and means for supplying at least a portion of one of said fractions of gas to said second enclosed space.

2. A refrigeration system for supplying cooled gas to a first and to a second enclosed space, said system comprising a heat exchanger for cooling a supply of hot compressed gas, means connected to said heat exchanger for delivering the cooled gas to said first enclosed space, a vortex tube connected to said heat exchanger for supplying a first fraction of gas at a temperature below that of said cooled gas and a second fraction of gas at a temperature above that of said cooled gas, and means for supplying at least a portion of one of said fractions of gas to said second enclosed space.

3. A refrigeration system for supplying cooled gas to a first and to a second enclosed space, said system comprising a heat exchanger for cooling a supply of hot compressed gas, means connected to said heat exchanger for delivering the cooled gas to said first enclosed space, a vortex tube connected to said heat exchanger for supplying a first fraction of gas at a temperature below that of said cooled gas and a second fraction of gas at a temperature above that of said cooled gas, and valve means for supplying predetermined portions of said fractions of gas to said second enclosed space.

4. A refrigeration system for supplying cooled air to a first enclosure and to a second substantially air-tight enclosure, said system comprising a heat exchanger for cooling a supply of hot compressed air, expansion means connected to said heat exchanger for further cooling and reducing the pressure of a portion of the cooled air, means connected to said heat exchanger and to said expansion means for combining predetermined portions of the cooled air from said heat exchanger and of the further cooled air from said expansion means and for supplying said predetermined portions to said first enclosure, a vortex tube connected to said heat exchanger for receiving the remainder of the cooled air therefrom and for supplying a first fraction of air at a temperature below that of said cooled air and a second fraction of air at a temperature above that of said cooled air, and means for supplying a portion of each of said fractions of air to said second enclosure.

5. A refrigeration system for supplying cooled air to a first enclosure and to a second substantially airtight enclosure disposed within said first enclosure, said system comprising a heat exchanger for cooling a supply of hot compressed air, an expansion turbine means connected to said heat exchanger for further cooling and reducing the pressure of a portion of the cooled air, means connected to said heat exchanger and to said expansion turbine means for combining predetermined portions of the cooled air from said heat exchanger and of the further cooled air from said expansion turbine means and for supplying said predetermined portions to said first enclosure, a vortex tube connected to said heat exchanger for receiving the remainder of the cooled air therefrom and for supplying a first fraction of air at a temperature below that of said cooled air and a second fraction at a temperature above that of said cooled air, and means for supplying a portion of each of said fractions of air to said second enclosure.

6. A refrigeration system for supplying cooled air to a first enclosure and to a second substantially airtight enclosure disposed within said first enclosure, said system comprising a heat exchanger for cooling a supply of hot compressed air, an expansion turbine connected to said heat exchanger for further cooling and reducing the pressure of a portion of the cooled air, means connected to said heat exchanger and to said expansion turbine for combining predetermined portions of the cooled air from said heat exchanger and of the further cooled air from said expansion turbine and for supplying said predetermined portions to said first enclosure, a vortex tube connected to said heat exchanger for receiving the remainder of the cooled air therefrom and for supplying a first fraction of air at a temperature below that of said cooled air and a second fraction of air at a temperture above that of said cooled air, duct means for connecting said vortex tube to said second enclosure, valve means in said duct means for controlling the portions of said air fractions supplied to said second enclosure, and temperature responsive means for controlling said valve means in response to the temperature of the air flowing into said second enclosure.

7. An air conditioning system for supplying air to an aircraft cabin and to a pressurized suit within said cabin, said system comprising a heat exchanger having an inlet for hot compressed air and a first and a second outlet for cooled compressed air, an expansion turbine connected to said first outlet and having a discharge duct for supplying expanded and further cooled air, conduit means connected to said first outlet and to said duct for supplying air to said cabin, temperature responsive means in said cabin for controlling the portions of air delivered to said cabin from said duct and from said heat exchanger, heat exchange means associated with said discharge duct and connected to said second outlet for further cooling compressed air supplied from said heat exchanger and for heating the air passing through said duct, a fan coupled to said turbine and driven thereby and disposed to force cooling fluid through said heat exchanger, a vortex tube connected to said heat exchange means for receiving the remainder of cooled air therefrom and for delivering a first fraction of air at a temperature below that of said cooled compressed air and a second fraction of air at a temperature above that of said cooled compressed air, conduit means connecting said vortex tube to said suit, and means responsive to the temperature of the air flowing into said suit for controlling the portions of the air fractions supplied to said suit.

8. An air conditioning system for supplying air to an aircraft cabin and to a pressurized suit within said cabin, said system comprising a heat exchanger having an inlet for hot compressed air and a first and a second outlet for cooled compressed air, an expansion turbine connected to said first outlet and having a discharge duct for supplying expanded and further cooled air, conduit means connected to said first outlet and to said duct for supplying air to said cabin, temperature responsive means in said cabin for controlling the portions of air delivered to said cabin from said duct and from said heat exchanger, heat exchange means associated with said discharge duct and connected to said second outlet for further cooling compressed air supplied from said heat exchanger and for heating the air passing through said duct, means associated with said heat exchange means for removing water condensed from the further cooled and compressed air, a fan coupled to said turbine and driven thereby and disposed to force cooling fluid through said heat exchanger, a vortex tube connected to said heat exchange means for receiving the remainder of cooled air therefrom and for delivering a first fraction of air at a temperature below that of said cooled compressed air and a second fraction of air at a temperature above that of said cooled compressed air, conduit means connecting said vortex tube to said suit, means responsive to the temperature of the air passing through said suit for controlling the portions of the air fractions supplied to said suit, and manually adjustable means for controlling the air pressure in said suit.

9. An air conditioning system for supplying air to an aircraft cabin and to a pressurized suit within said cabin, said system comprising a heat exchanger having an inlet for hot compressed air and a first and a second outlet for cooled compressed air, an expansion turbine connected to said first outlet and having a discharge duct for supplying expanded and further cooled air, first conduit means connected to said first outlet and to said duct for supplying air to said cabin, first valve means in said first conduit means, temperature responsive means in said cabin for controlling said first valve means, thereby to control the portions of air delivered to said cabin from said duct and from said heat exchanger, heat exchange means associated with said discharge duct and connected to said second outlet for further cooling compressed air supplied from said heat exchanger and for heating the air passing through said duct, a fan coupled to said turbine and driven thereby and disposed to force cooling fluid through said heat exchanger, a vortex tube connected to said heat exchange means for receiving the remainder of cooled air therefrom and for delivering a first fraction of air at a temperature below that of said cooled compressed air and a second fraction of air at a temperature above that of said cooled compressed air, second conduit means connecting said vortex tube to said suit, second valve means in said second conduit means, and means responsive to the temperature of the air flowing into said suit for controlling said second valve means, thereby to control the portions of the air fractions supplied to said suit.

10. An air conditioning system for supplying air to an aircraft cabin and to a pressurized suit within said cabin, said system comprising a heat exchanger having an inlet for hot compressed air and a first and a second outlet for cooled compressed air, an expansion turbine connected to said first outlet and having a discharge duct for supplying expanded and further cooled air, first conduit means connected to said first outlet and to said duct for supplying air to said cabin, temperature responsive means in said cabin for controlling the portions of air delivered to said cabin from said duct and from said heat exchanger, heat exchange means associated with said discharge duct and disposed adjacent said turbine and connected to said second outlet for further cooling compressed air supplied from said heat exchanger and for heating the air passing through said duct for preventing icing of said duct, a pipe connected between said heat exchange means and said first conduit means for removing water condensed from the further cooled and compressed air and supplying it to said cabin, a fan coupled to said turbine and driven thereby and disposed to force cooling fluid through said heat exchanger, a vortex tube connected to said heat exchange means for receiving the remainder of cooled air therefrom and for delivering a first fraction of air at a temperature below that of said cooled compressed air and a second fraction of air at a temperature above that of said cooled compressed air, second conduit means connecting said vortex tube to said suit, valve means in said second conduit means, means responsive to the temperature of the air supplied to said suit for controlling said valve means, thereby to control the portions of the air fractions supplied to said suit, and manually adjustable means for controlling the air pressure in said suit.

11. An air conditioning system as defined in claim 8 wherein said second outlet of said heat exchanger is disposed to supply compressed air that is cooler than that supplied by said first outlet.

12. An air conditioning system as defined in claim 10 wherein said second outlet of said heat exchanger is disposed to supply compressed air that is cooler than that supplied by said first outet.

13. In a system for supplying compressible fluid of predetermined temperature to an enclosed space, a source of gaseous fluid to be conducted to said space, vortex tube means having its inlet connected to receive fluid from said source, outlet means for hot gaseous fluid, and outlet means for cool gaseous fluid; duct means connected respectively to said outlet means and to said space; valve means in said duct means for controlling flow of said hot gaseous fluid and said cool gaseous fluid through said duct means from said vortex tube into said space; and pressure regulating means to control the fluid pressure within said enclosed space.

14. In a system for supplying compressible fluid of predetermined temperature to an enclosed space, a source of gaseous fluid to be conducted to said space, vortex tube means having its inlet connected to receive fluid from said source, outlet means for hot gaseous fluid, and outlet means for cool gaseous fluid; duct means connected respectively to said outlet means and to said space; valve means in said duct means for controlling flow of said hot gaseous fluid and said cool gaseous fluid through said duct means from said vortex tube into said space; means responsive to the temperature of the gaseous fluid flowing into said enclosed space for controlling operation of said valve means; and pressure regulating means to control the fluid pressure within said enclosed space.

15. A system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas for supplying a first fraction thereof at a temperature below and a second fraction thereof at a temperature above that of the gas supplied to said second conditioning means, means for supplying at least a portion of one of said fractions of gas to said second enclosed space, and duct means interconnecting said first and second conditioning means.

16. A system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas for supplying a first fraction thereof at a temperature below and a second fraction thereof at a temperature above that of the gas supplied to said second conditioning means, means for supplying at least a portion of one of said fractions of gas to said enclosed space, and duct means interconnecting said first and second enclosures.

17. A system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas for supplying a first fraction thereof at a temperature below and a second fraction thereof at a temperature above that of the gas supplied to said second conditioning means, means for supplying at least a portion of one of said fractions of gas to said second enclosed space, and duct means interconnecting the inlet of one of said conditioning means with the outlet of the other of said conditioning means.

18. A system for supplying conditioned gas to a first and to a second enclosed space, comprising first means for conditioning means for a system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas for supplying a first fraction thereof at a temperature below and a second fraction thereof at a temperature above that of the gas supplied to said second conditioning means, means for supplying at least a portion of one of said fractions of gas to said second enclosed space, duct means interconnecting said first and second enclosures and further duct means interconnecting the inlet of one of said conditioning means to the outlet of the other of said conditioning means.

19. A system for supplying conditioned gas to a first enclosed space and to a second enclosed space within said first said enclosed space, said system comprising first means for conditioning a supply of compressed gas, first means connected to said first conditioning means for delivering the conditioned gas to said first enclosed space, second means for conditioning a supply of compressed gas, second means connected to said second conditioning means for delivering the conditioned gas to said second enclosed space, and duct means interconnecting said first and second conditioning means.

20. A system for supplying conditioned gas to a first enclosed space and to a second enclosed space within said first said enclosed space, said system comprising first means for conditioning a supply of compressed gas, first means connected to said first conditioning means for delivering the conditioned gas to said first enclosed space, second means for conditioning a supply of compressed gas, second means connected to said second conditioning means for delivering the conditioned gas to said second enclosed space, one of said enclosed spaces having an outlet into the other, and duct means interconnecting said first and second conditioning means.

21. A system for supplying conditioned gas to a first enclosed space and to a second enclosed space within said first enclosed space, said system comprising first means for conditioning a supply of compressed gas, first means connected to said first conditioning means for delivering the conditioned gas to said first enclosed space, second means for conditioning a supply of compressed gas, second means connected to said second conditioning means for delivering the conditioned gas to said second enclosed space, both of said enclosed spaces being provided with a common outlet, and duct means interconnecting said first and second conditioning means.

22. A system for supplying conditioned gas to a first enclosed space and to a second enclosed space within said first enclosed space, said system comprising first means for conditioning a supply of compressed gas, first means connected to said first conditioning means for delivering the conditioned gas to one of said spaces, second means for conditioning a supply of compressed gas, said second conditioning means being located within said first enclosed space and adjacent to said second enclosed space, and second means connected to said second conditioning means for delivering the conditioned gas to the other of said enclosed spaces.

23. A system for supplying conditioned gas to a first enclosed space and to a second enclosed space within said first enclosed space, said system comprising first means for conditioning a supply of compressed gas, first means connected to said first conditioning means for delivering the conditioned gas to one of said enclosed spaces, second means for conditioning a supply of compressed gas, said second conditioning means being located within said first enclosed space and adjacent to said second enclosed space, and second means connected to said second conditioning means for delivering the conditioned gas to the other of said enclosed spaces, one of said enclosed spaces having an outlet into the other.

24. A system for supplying conditioned gas to a first enclosed space and to a second enclosed space within said first enclosed space, said system comprising first means for conditioning a supply of compressed gas, first means connected to said first conditioning means for delivering the conditioned gas to one of said enclosed spaces, second means for conditioning a supply of compressed gas, said second conditioning means being located within said first enclosed space and adjacent to said second enclosed space, and second means connected to said second conditioning means for delivering the conditioned gas to said second enclosed space, both of said enclosed spaces being provided with a common outlet.

25. A system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas, means connected to said second conditioning means for delivering the conditioned gas to said second enclosed space, duct means interconnecting said first and second conditioning means, and duct means interconnecting said first and second enclosed spaces.

26. A system for supplying conditioned gas to a first and to a second enclosed space, comprising first means for conditioning a supply of compressed gas, means connected to said first conditioning means for delivering the conditioned gas to said first enclosed space, second means for conditioning a supply of compressed gas, means connected to said second conditioning means for delivering the conditioned gas to said second enclosed space, duct means interconnecting the inlet of one of said conditioning means with the outlet of the other of said conditioning means, and duct means interconnecting said first and second enclosed spaces.

27. A system for supplying conditioned gas to a first enclosed space and to a second enclosed space within said first enclosed space, comprising first means for conditioning a supply of compressed gas, means connected to said first conditioning means for delivering the conditioned gas to one of said enclosed spaces, second means for conditioning a supply of compressed gas for supplying a first fraction thereof at a temperature below and a second fraction thereof at a temperature above that of the gas supplied to said second conditioning means, means for supplying at least a portion of one of said fractions of gas to the other of said enclosed spaces, and duct means interconnecting the inlet of one of said conditioning means with the outlet of the other of said conditioning means.

28. A system for supplying conditioned gas to a first enclosed space and to a second enclosed space within said first enclosed space, said system comprising first means for conditioning a supply of compressed gas, means connected to said first conditioning means for delivering the conditioned gas to one of said enclosed spaces, second means for conditioning a supply of compressed gas for supplying a first fraction thereof at a temperature below and a second fraction thereof at a temperature above that of the gas supplied to said second conditioning means, means for supplying at least a portion of one of said fractions of gas to the other of said enclosed spaces, one of said conditioning means being located within said first enclosed space and adjacent to said second enclosed space, and duct means interconnecting the inlet of one of said conditioning means to the outlet of the other of the said conditioning means.

References Cited in the file of this patent

UNITED STATES PATENTS

| | | |
|---|---|---|
| 1,380,406 | Mott | June 7, 1921 |
| 1,952,281 | Ranque | Mar. 27, 1934 |
| 2,093,834 | Gaugler | Sept. 21, 1937 |
| 2,130,089 | Hull | Sept. 13, 1938 |
| 2,255,751 | Bancel | Sept. 16, 1941 |
| 2,284,764 | Parks | June 3, 1942 |

(Other references on following page)

UNITED STATES PATENTS

| | | |
|---|---|---|
| 2,540,547 | Rodert | Feb. 6, 1951 |
| 2,561,633 | Palmatier | July 24, 1951 |
| 2,581,168 | Bramley | Jan. 1, 1952 |
| 2,632,307 | Massey | Mar. 24, 1953 |
| 2,644,315 | Jamieson | July 7, 1953 |
| 2,669,101 | Shields | Feb. 16, 1954 |
| 2,693,088 | Green | Nov. 2, 1954 |
| 2,737,028 | Machlanski | Mar. 6, 1956 |
| 2,741,899 | Von Linde | Apr. 17, 1956 |

FOREIGN PATENTS

| | | |
|---|---|---|
| 1,090,306 | France | Mar. 29, 1955 |

U. S. DEPARTMENT OF COMMERCE
PATENT OFFICE

CERTIFICATE OF CORRECTION

Patent No. 2,819,590                                  January 14, 1958

Frederick H. Green

It is hereby certified that error appears in the printed specification of the above numbered patent requiring correction and that the said Letters Patent should read as corrected below.

Column 4, line 6, after "in" insert -- is --; column 5, line 35, for "unit" read -- suit --.

Signed and sealed this 11th day of March 1958.

(SEAL)
Attest:

KARL H. AXLINE
Attesting Officer

ROBERT C. WATSON
Commissioner of Patents